(12) United States Patent
Igarashi et al.

(10) Patent No.: US 6,573,004 B1
(45) Date of Patent: Jun. 3, 2003

(54) BINDER CONTAINING VINYL ALCOHOL POLYMER, SLURRY, ELECTRODE, AND SECONDARY BATTERY WITH NONAQUEOUS ELECTROLYTE

(75) Inventors: Ichirou Igarashi, Kawasaki (JP); Keiko Imai, Kawasaki (JP); Kouichirou Maeda, Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/554,118

(22) PCT Filed: Nov. 10, 1998

(86) PCT No.: PCT/JP98/05040
§ 371 (c)(1),
(2), (4) Date: May 10, 2000

(87) PCT Pub. No.: WO99/25039
PCT Pub. Date: May 20, 1999

(30) Foreign Application Priority Data

Nov. 10, 1997 (JP) .............................. 9-323727

(51) Int. Cl.$^7$ .............................................. H01M 4/62
(52) U.S. Cl. .................................. 429/217; 29/623.1
(58) Field of Search .................................. 429/217, 206

(56) References Cited

U.S. PATENT DOCUMENTS

| | | | |
|---|---|---|---|
| 5,525,444 A | * 6/1996 | Ito .............................. | 429/206 |
| 5,645,958 A | * 7/1997 | Zhang ........................ | 429/192 |
| 5,707,759 A | * 1/1998 | Simon ........................ | 429/217 |
| 5,962,168 A | * 10/1999 | Denton, III ................ | 429/303 |
| 6,110,656 A | * 8/2000 | Eichorst .................... | 430/527 |
| 6,153,332 A | * 11/2000 | Nishida ...................... | 429/217 |

FOREIGN PATENT DOCUMENTS

JP 01 52380 A 2/1989

* cited by examiner

Primary Examiner—Patrick Ryan
Assistant Examiner—Mark Ruthkosky
(74) Attorney, Agent, or Firm—Armstrong, Westerman & Hattori, LLP

(57) ABSTRACT

A binder for an electrode of a non-aqueous electrolyte secondary battery comprising a vinyl alcohol polymer having 30 to 95% by weight of recurring units expressed by the following formula (1):

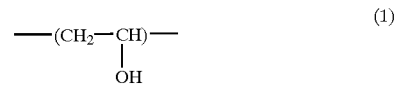

A slurry containing this binder, an active material and a liquid medium is used to produce an electrode. A non-aqueous electrolyte secondary battery having the electrode as a positive electrode and/or a negative electrode exhibits a minimized reduction in capacity at repeated charge-discharge cycles.

14 Claims, 1 Drawing Sheet

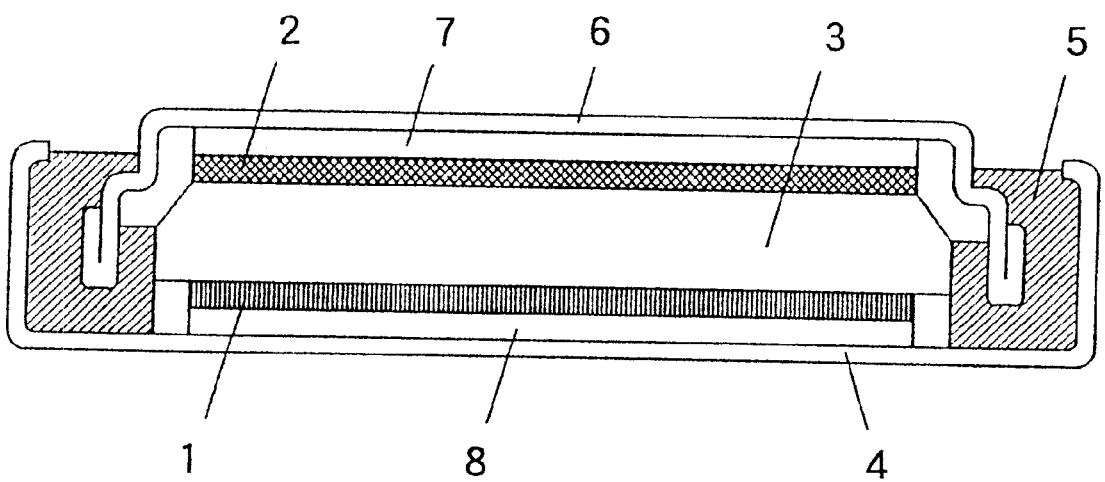
F I G. 1

BINDER CONTAINING VINYL ALCOHOL POLYMER, SLURRY, ELECTRODE, AND SECONDARY BATTERY WITH NONAQUEOUS ELECTROLYTE

TECHNICAL FIELD

This invention relates to a binder for an electrode comprising a vinyl alcohol polymer, a slurry thereof, an electrode made by using the slurry and a non-aqueous electrolyte secondary battery.

BACKGROUND ART

In recent years portable instruments such as video cameras, portable telephones and personal computers have spread wide. Thus, there is an increasing demand for secondary batteries, which can be repeatedly used, in substitution for primary batteries which are disposable.

Among the currently available secondary batteries, nickel cadmium batteries with an alkali electrolyte are most widely used. However, nickel cadmium batteries have problems such that the voltage generated is low and thus the energy density is not enhanced, and the self-discharge is large.

Non-aqueous electrolyte secondary batteries with a negative electrode made of light metal such as lithium attract attention because of high energy density, reduced self-discharge and lightness in weight. However, the secondary batteries with a lithium negative electrode have poor practicality because, with repetition of charge and discharge, metallic lithium crystal develops in the form of dendrite and contacts a positive electrode causing short circuit.

To solve this problem, a proposal has been made wherein an alloy of lithium with other metals is used as a negative electrode of a non-aqueous electrolyte secondary battery. This secondary battery also has poor practicality because another problem arises in that the alloy electrode is collapsed into granules with repetition of charge-discharge cycles.

A further proposal has been made wherein a carbonaceous material such as coke or graphite is used as an active material for a negative electrode of a non-aqueous electrolyte secondary battery. In this battery, doping and dedoping of lithium ion in and from a laminar structure of carbon are utilized for the negative electrode reaction, and thus, problems of the deposition of lithium metal or the granulation of lithium alloy occurring with the prior art batteries using lithium metal or lithium alloy as an active material for a negative electrode do not arise and good charge-discharge cycling characteristics are obtained. Further, when the active material for a positive electrode is made of a lithium transition metal oxide represented by the formula: $Li_xMO_2$ wherein M is at least one transition metal and x satisfies an inequality of $0.05<x<1.10$, battery capacity is enhanced and a non-aqueous electrolyte secondary battery having a high energy density is obtained.

In this proposed non-aqueous electrolyte secondary battery, the carbonaceous material used as an active material for a negative active material generally has a laminar structure and various forms such as scaly, global, fibrous and other indetermined forms. The lithium-transition metal oxide as an active material for a positive electrode also has a laminar crystal structure and an indetermined form. Upon charging, lithium ion is partly dedoped, i.e., deintercalated, from the laminar crystal structure of a positive electrode and is doped, i.e., intercalated, into the laminar structure of carbon in a negative electrode to form an intercalation compound. Upon discharging, lithium ion moves inversely from the negative electrode to the positive electrode.

A metal foil collector made of, for example, copper or aluminum used in positive and negative electrodes has a function of assisting the movement of electric charges of doped or dedoped lithium ion from a positive electrode to a negative electrode, or from the former to the latter, and further minimizing the loss of electric charges occurring during the course of movement, leading enhancement of the charge-discharge cycling characteristics.

The carbonaceous material and lithium transition metal oxide as active materials in a non-aqueous electrolyte secondary battery are usually used in the form of a powder having an average particle diameter of 0.5 to 60 μm, and cannot be employed as they are for the formation of electrode layers on collectors. Thus, various polymeric adhesives are used as a binder for the electrode formation. As the binder, polymeric adhesives having no problems encountered with the above-mentioned conventional non-aqueous electrolyte secondary batteries are desired.

For example, when carbonaceous material is used as an active material for a negative electrode of a non-aqueous electrolyte secondary battery, a carbonaceous material is finely divided into a powder form and the powdery carbon is dispersed together with a binder in water or an organic solvent to form a slurry for a negative electrode and then a collector for the negative electrode is coated with the slurry. Thus, a negative electrode having the negative active material bound onto the surface of a negative collector by a binder is obtained. Similarly, for example, when a lithium transition metal oxide is used as an active material for a positive electrode, the lithium transition metal oxide in a powder form is dispersed together with an electrically conductive material and a binder in water or an organic solvent to form a slurry for a positive electrode and then a collector for the positive electrode is coated with the slurry. Thus, a positive electrode having the positive active material bound onto the surface of a positive collector by a binder is obtained.

As the binder for electrodes, fluoropolymers such as polyvinylidene fluoride and polytetrafluoroethylene are used in view of good resistance to organic solvents (Japanese Unexamined Patent Publication [hereinafter abbreviated to "JP-A"] No. H5-62668, JP-A H8-124561 and JP-A H8-157677). However, fluoropolymer binders such as polyvinylidene fluoride have problems such that they have poor binding power or adhesion to an electrode collector and poor retention of an active material, and thus, the active material bound onto the electrode collector is easily separated from the collector at the repetition of charge and discharge, and the capacity of battery is reduced to a considerable extent with relatively small times repetition of charge and discharge.

Therefore, strong binding powers between a collector and active material and between active material particles (hereinafter briefly referred to as "binding power" when appropriate) and a good binding durability by which separation of an active material from a collector and from each other caused by volume change of active material particles at repetition of charge and discharge (hereinafter briefly referred to as "binding durability" when appropriate) are required to minimize the capacity reduction occurring at repetition of charge-discharge cycles.

To provide a binder for electrodes having good binding durability, water-soluble polymers such as cellulosic compounds and polyethylene glycol have also been proposed (JP-A H8-273671). However, the binding power is not always sufficient and breakage of electrodes is sometimes caused.

DISCLOSURE OF THE INVENTION

An object of the present invention is to provide a binder for electrodes having good adhesion to an electrode collector and good retention of an active material.

Another object of the present invention is to provide a slurry for electrodes containing the above-mentioned binder for electrodes.

A still another object of the present invention is to provide an electrode for a non-aqueous electrolyte secondary battery, made by using the above-mentioned slurry for electrodes.

A further object of the present invention is to provide a non-aqueous electrolyte secondary battery, equipped with the above-mentioned electrode, exhibiting good charge-discharge cycling characteristics.

To attain the above-mentioned objects, the inventors made extensive research into a binder having good binding power and binding durability, and found that a binder comprised of a polymer having a specified proportion of vinyl alcohol recurring units can provide a non-aqueous electrolyte secondary battery exhibiting a minimized reduction of battery capacity at the repetition of charge and discharge. Based on this finding, the present invention has been completed.

In one aspect of the present invention, there is provided a binder for an electrode of a non-aqueous electrolyte secondary battery characterized by comprising a vinyl alcohol polymer having 30 to 95% by weight of recurring units expressed by the following formula (1):

$$-(CH_2-CH)- \atop \quad\quad\;\; | \atop \quad\quad\;\, OH \quad\quad\quad\quad (1)$$

In another aspect of the present invention, there is provided a slurry for an electrode of a non-aqueous electrolyte secondary battery containing the above-mentioned binder comprising the vinyl alcohol polymer, an active material and a liquid medium.

In still another aspect of the present invention, there is provided an electrode for a non-aqueous electrolyte secondary battery, made from the above-mentioned slurry for an electrode.

In a further aspect of the present invention, there is provided a non-aqueous electrolyte secondary battery equipped with the above-mentioned electrode made from the slurry for an electrode.

BRIEF DESCRIPTION OF THE DRAWING

FIG. 1 is a cross-sectional view illustrating a structure of a cell used for measuring a retention ratio of capacity at repeated charge-discharge cycles.

BEST MODE FOR CARRYING OUT THE INVENTION

Binder for Electrode of Non-Aqueous Electrolyte Secondary Battery

The binder for an electrode of a non-aqueous electrolyte secondary battery of the invention comprises a vinyl alcohol polymer and, if desired, an optional polymeric binder.

The vinyl alcohol polymer contained in the binder of the invention has recurring units represented by formula (1). The amount of the recurring units of formula (1) in the polymer is in the range of 30 to 95% by weight, preferably 50 to 90% by weight and more preferably 55 to 80% by weight, based on the weight of the polymer. When the amount of the recurring units of formula (1) is in this range, the binding power and the binding durability are good and the charge-discharge cycling characteristics are satisfactory. If the amount of the recurring units of formula (1) is too small, the binding power and the binding durability are poor. In contrast, if the amount of the recurring units of formula (1) is too large, the retention of battery capacity is reduced.

As the recurring units other than those of formula (1) in the vinyl alcohol polymer, there can be mentioned (i) recurring units which are derived from vinyl monomers having a functional group other than a hydroxyl group and which are selected from recurring units represented by the following formulae (2) through (10), and (ii) recurring units derived from diene monomers such as butadiene and isoprene.

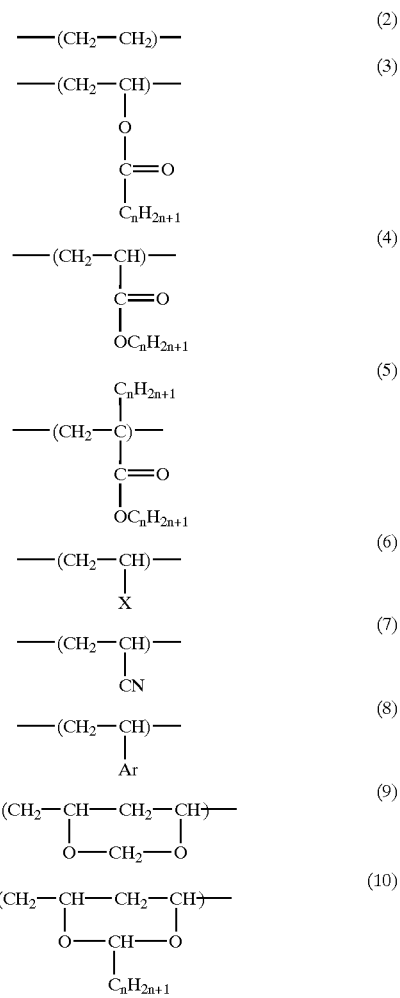

wherein n and m are integers independently selected from the range of 1 to 8, preferably 1 to 6 and more preferably 1 to 4, Ar is an aromatic group, preferably phenyl group, and X is a halogen, preferably chlorine. Of these recurring units, those represented by formulas (2) and (3) are preferable in view of good charge-discharge cycling characteristics.

The process for producing the vinyl alcohol polymer used in the invention is not particularly limited. As examples of the production process, there can be mentioned (i) a process wherein a precursor for vinyl alcohol, such as vinyl acetate, is polymerized alone or copolymerized with other monomer, and then at least part of the units derived from vinyl acetate in the thus-obtained polymer is saponified by an alkali to convert into units of formula (1); and (ii) a process wherein the thus-produced polymer having units of formula (1) and vinyl acetate units is allowed to react with an aldehyde whereby units of, for example, formula (9) or (10) are introduced into the polymer.

More specifically, for example, a vinyl acetate monomer is subjected to a solution polymerization in methanol in the presence of a polymerization initiator, and the thus-produced polyvinyl acetate is subjected to alcoholysis by using an alkali catalyst whereby the polymer is saponified into a vinyl alcohol-vinyl acetate copolymer having units of formula (1) and units of formula (3) (n=1). By varying the saponification conditions and the degree of polymerization, the ratio of vinyl alcohol units of formula (1) to vinyl acetate units of formula (3) (n=1) can be appropriately controlled. Similarly, an ethylene-vinyl alcohol copolymer and an ethylene-vinyl alcohol-vinyl acetate copolymer can be produced by saponifying an ethylene-vinyl acetate copolymer prepared by copolymerization of ethylene with vinyl acetate.

When a vinyl alcohol-vinyl acetate copolymer prepared by partial saponification of polyvinyl acetate is allowed to react with, for example, butylaldehyde, a vinyl alcohol-vinyl butyral-vinyl actetate copolymer can be obtained.

The copolymers prepared by the above-mentioned processes may also be prepared by other processes.

The unit of formula (1) is a vinyl alcohol unit. The vinyl alcohol unit is generally produced by a process wherein a precursor for vinyl alcohol, which is capable of producing a vinyl alcohol unit by saponification using an alkali, such as vinyl acetate, is polymerized alone or copolymerized, and the obtained polymer is saponified.

As specific examples of the monomers which form comonomer units in vinyl alcohol copolymers, represented by formulae (2) through (10), there can be mentioned ethylene [formula (2)], vinyl acetate [formula (3), n=1], an alkyl acrylate [formula (4), m=1 to 8, preferably 1 to 6 and more preferably 1 to 4], an alkyl methacrylate [formula (5), n=1, m=1 to 8, preferably 1 to 6 and more preferably 1 to 4], vinyl chloride [formula (6), X=Cl], acrylonitrile [formula (7)], styrene [formula (8), Ar=phenyl]), vinyl butyral [formula (10), n=3], vinyl formal [formula (9)], and a vinyl carboxylate [formula (3), n=1 to 8, preferably 1 to 6 and more preferably 1 to 4].

Preferable vinyl alcohol polymers used in the invention include, for example, copolymers having units of formula (1) and at least one kind of units selected from units of formula (2), units of formula (3) (n=1) and units of formula (10) (n=3). As specific examples of the copolymers, there can be mentioned an ethylene-vinyl alcohol copolymer (saponification product of an ethylene-vinyl acetate copolymer), a vinyl acetate-vinyl alcohol copolymer (partial saponification product of polyvinyl acetate) and a vinyl acetate-vinyl butyral-vinyl alcohol copolymer (reaction product of partial saponification product of polyvinyl acetate with butyl aldehyde).

The degree of polymerization of the vinyl alcohol polymer is in the range of 300 to 20,000, preferably 500 to 18,000 and more preferably 800 to 15,000. When the degree of polymerization is too large, workability and coatability are poor and uniform coating film Cannot be formed, leading to reduction of cycling characteristics and retention ratio of capacity at repeated charge-discharge cycles. In contrast, when the degree of polymerization is too small, cracking occurs at a step of electrode production, The vinyl alcohol polymer can be used either alone or in combination with conventional binders to improve performance of the resulting batteries. The amount of such binders is not larger than 800 parts by weight, preferably not larger than 500 parts by weight, based on 100 parts by weight of the vinyl alcohol copolymer. When the amount of the conventional binders is within this range, good binding power and binding durability are retained and the reduction of capacity at repeated charge-discharge cycles is minimized.

As specific examples of the binders used in combination with the vinyl alcohol polymer, there can be mentioned fluoropolymers such as polyvinylidene fluoride and polytetrafluoroethylene; homopolymers and copolymers of conjugated diene monomers such as polybutadiene, polyisoprene, styrene-butadiene copolymer, styrene-isoprene copolymer, styrene-butadiene-isoprene copolymer, styrene-butadiene-styrene block copolymer, butadiene-acrylonitrile copolymer, butadiene-isoprene-acrylonitrile copolymer, styrene-acrylonitrile-butadiene copolymer, styrene-acrylonitrile-butadiene-methyl methacrylate copolymer, styrene-acrylonitrile-butadiene-itaconic acid copolymer, styrene-acrylonitrile-butadiene-methyl methacrylate-fumaric acid copolymer, styrene-butadiene block copolymer and styrene-butadiene-itaconic acid-methyl methacrylate-acrylonitrile copolymer; homopolymers and copolymers of acrylic acid ester and methacrylic acid ester monomers such as styrene-n-butyl acrylate-itaconic acid-methyl methacrylate-acrylonitrile copolymer, 2-ethylhexyl acrylate-methyl acrylate-acrylic acid-methoxypolyethylene glycol monomethacrylate and polymethyl methacrylate; homopolymers and copolymers of α-olefins such as ethylene-propylene copolymer, ethylene-propylene-diene copolymer, styrene-ethylene-butylene-styrene block copolymer, styrene-isoprene block copolymer, styrene-ethylene-propylene-styrene block copolymer and styrene-ethylene-styrene-butadiene block copolymer; polymers of vinyl compounds such as polyvinyl alcohol and polyvinyl acetate; and cellulose compounds such as cellulose, methyl cellulose, ethyl cellulose, propyl cellulose, isopropyl cellulose, butyl cellulose, hydroxyethyl cellulose, hydroxypropyl cellulose, carboxymethyl cellulose, carboxyethyl cellulose, carboxypropyl cellulose and carboxymethyl ethyl cellulose.

Of these polymeric binders used in combination with the vinyl alcohol polymer, preferable are homopolymers and copolymers of conjugated diene monomers such as styrene-butadiene copolymer, styrene-butadiene-styrene block copolymer and styrene-isoprene block copolymer; homopolymers and copolymers of a-olefin such as styrene-ethylene-styrene-butadiene block copolymer; and homopolymers and copolymers of acrylic acid ester and methacrylic acid ester monomers such as polymethyl methacrylate, styrene-acrylonitrile-1,3-butadiene-methyl acrylate copolymer and styrene-n-butyl acrylate-itaconic acid-methyl methacrylate-acrylonitrile copolymer.

Slurry for Non-Aqueous Electrolyte Secondary Battery Electrode

The slurry of the invention for an electrode of a non-aqueous electrolyte secondary battery is a dispersion or solution in a liquid medium of a mixture of the binder comprising as one ingredient the above-mentioned vinyl alcohol polymer, with at least one active material for a negative electrode or a positive electrode.

Although the electrolyte in the secondary battery of the invention is non-aqueous, the liquid medium used for the preparation of the slurry for an electrode of the secondary battery may be either an organic medium or water.

The slurry can be prepared by any conventional procedure which includes, for example, a procedure wherein a binder is dispersed or dissolved in or kneaded with a liquid medium to give a dispersion, solution or kneaded mixture, and then other additives and an active material are incorporated in the dispersion, solution or kneaded mixture.

When the liquid medium is water, a vinyl alcohol copolymer having a relatively large proportion, i.e., at least about 70% by weight, of units of formula (1) is preferably used.

When the liquid medium is an organic medium, a vinyl alcohol copolymer having units of formula (1) and hydrophobic units such as ethylene units of formula (2) —(CH$_2$—CH$_2$)— or styrene units of formula (8) is preferably used. The copolymer may comprise additional units derived from vinyl acetate or other monomers. As specific example of the preferable copolymer, there can be mentioned an ethylene-vinyl acetate-vinyl alcohol copolymer.

The liquid medium used includes, for example, water and organic mediums which includes, for example, hydrocarbon compounds, nitrogen-containing organic compounds, oxygen-containing organic compounds, chlorine-containing organic compounds and sulfur-containing organic compounds. These liquid mediums may be used either alone or as a mixture of at least two thereof.

As specific examples of the hydrocarbon compounds, there can be mentioned aromatic hydrocarbon compounds such as benzene, toluene and xylene, and saturated hydrocarbon compounds such as n-butane, n-pentane, n-hexane, n-heptane, n-octane, isooctane, cyclopentane, cyclohexane, methylcyclohexane, ethylcyclohexane, nonane, decane, decaline, dodecane, gasoline and industrial gasoline.

As specific examples of the nitrogen-containing organic compounds, there can be mentioned nitroethane, 1-nitropropane, 2-nitropropane, acetonitrile, triethylamine, cyclohexylamine. pyridine, monoethanolamine, diethanolamine, morpholine, N,N-dimethylformamide and N-methylpyrrolidone.

As specific examples of the oxygen-containing organic compounds, there can be mentioned hydroxyl group-containing compounds such as methanol, ethanol, n-propyl alcohol, isopropyl alcohol, n-butyl alcohol, isobutyl alcohol, sec-butyl alcohol, amyl alcohol, isoamyl alcohol, methylisobutylcarbinol, 2-ethylbutanol, 2-ethylhexanol, cyclohexanol, furfuryl alcohol, tetrahydrofurfuryl alcohol, ethylene glycol, hexylene glycol and glycerine; saturated aliphatic ethers such as dipropyl ether, diisopropyl ether, dibutyl ether, diisobutyl ether, di-n-amyl ether, isoamyl ether, methyl butyl ether, methyl isobutyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether; unsaturated aliphatic ethers such as allyl ether and ethyl allyl ether; aromatic ethers such as anisole, phenetole, phenyl ether and benzyl ether; cyclic ethers such as tetrahydrofuran, tetrahydropyran and dioxane; ethylene glycols such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; organic acids such as formic acid, acetic acid, acetic anhydride and butyric acid; organic acid esters such as butyl formate, amyl formate, propyl acetate, isopropyl acetate, butyl acetate, sec-butyl acetate, amyl acetate, isoamyl acetate, 2-ethylhexyl acetate, cyclohexyl acetate, ethyl propionate, butyl proplonate, amyl propionate, butyl butyrate, diethyl carbonate, diethyl oxalate, methyl lactate, ethyl lactate, butyl lactate and triethyl phosphate; ketones such as diethyl ketone, dipropyl ketone, dibutyl ketone, methyl isopropyl ketone, methyl isobutyl ketone, diisobutyl ketone, acetylacetone, diacetone alcohol, cyclohexanone, cyclopentanone, methylcyclohexanone and cycloheptanone; and isophorone and furfural.

As specific examples of the chlorine-containing organic compounds, there can be mentioned chlorohydrocarbons such as tetrachloroethane, trichloroethylene, perchloroethylene, dichloropropane, amyl chloride, dichloropentane and chlorobenzene.

As specific examples of the sulfur-containing organic a compounds, there can be mentioned thiophene, sulfolane and dimethylsulfoxide.

The active material for a negative electrode includes carbonaceous materials capable of being doped and dedoped with, for example, lithium. As specific examples of the active material for a negative electrode, there can be mentioned electrically conductive polymers such as polyacetylene and polypyrrole; and coke, polymer carbon and carbon fiber. Further, thermally cracked carbon, petroleum coke, pitch coke, coal coke and other cokes, carbon black such as acetylene black, glass carbon, sintered organic high polymers (i.e., product obtained by sintering an organic high polymer at a temperature of at least 500° C. in an inert gas atmosphere or under vacuum) and carbon fiber are also preferably used because of high energy density per unit volume.

The active material for a positive electrode includes, for example, transition metal oxides such as manganese dioxide and vanadium pentoxide, transition metal chalcogenides such as iron sulfide and titanium sulfide, and lithium compounds thereof. Especially lithium transition metal oxides such as a lithium cobalt oxide, a lithium manganese oxide and a lithium cobalt nickel oxide are preferable because high voltage and high energy density can be obtained and good charge-discharge cycling characteristics can also be obtained.

Electrode for Non-Aqueous Electrolyte Secondary Battery

The electrode of the invention for a non-aqueous electrolyte secondary battery is a positive electrode and/or a negative electrode, which is prepared by coating a collector with the above-mentioned slurry and drying the thus-formed coating. The collector used is not particularly limited provided that it is composed of an electrically conductive material. The collector is usually composed of metal such as iron, copper, aluminum, nickel or stainless steel. The shape of the collector is also not particularly limited, and the collector is usually used in a sheet form having a thickness of about 0.001 to 0.5 mm.

The collector can be coated with the above-mentioned slurry by a conventional coating procedure such as reverse-roll coating, direct-roll coating, blade coating, knife coating, extrusion coating, curtain coating, gravure coating, bar coating, dip coating or squeeze coating. Of these, blade coating, knife coating and extrusion coating are preferable. A coating having good surface state can be obtained by appropriately selecting a coating procedure depending upon the physical properties and drying property of a binder solution. The coating may be conducted either on one surface of a collector or both surfaces thereof. When both surfaces thereof are coated, the coating can be carried out either sequentially one surface by one surface, or simultaneously on both surfaces. The coating can also be carried out in a continuous or intermittent manner, and on the entire surface or in a stripe pattern. The thickness, width and length of the coating are determined depending upon the size of a battery.

The coated slurry can be dried by a conventional procedure, Preferable drying procedures include hot-air drying, vacuum drying, infrared drying, far-infrared drying, electron radiation drying and cold-air drying. These drying procedures can be carried out either alone or in combination. The drying temperature is preferably in the range of 80 to 350° C., more preferably 100 to 250° C.

The electrode can be pressed, if desired. The pressing can be carried out by a conventional procedure, but a mold pressing and a calender roll pressing are preferable. The pressing pressure is not particularly limited, but is preferably in the range of 0.2 to 3 ton/cm$^2$.

Non-Aqueous Electrolyte Secondary Battery

The non-aqueous electrolyte secondary battery of the invention is made by using the above-mentioned positive and/or negative electrode, an electrolyte and optional parts such as a separator by a conventional procedure. The shape of the battery includes, for example, coin-shape, button-shape, sheet-form, cylindrical shape, rectangular shape and flat shape.

The electrolyte of the battery includes known lithium salts. As specific examples of the electrolyte, there can be mentioned $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiC_4F_9SO_3$, $Li(CF_3SO_2)_2N$ and lithium salts of lower fatty acids.

The liquid medium used for the electrolyte is not particularly limited and includes conventional liquid mediums. As specific examples of the liquid medium, there can be mentioned carbonates such as propylene carbonate, ethylene carbonate, butylene carbonate, dimethyl carbonate and diethyl carbonate; lactones such as γ-butyrolactone; ethers such as trimethoxymethane, 1,2-dimethoyethane, diethyl ether, 2-ethoxyethane, tetrahydrofuran and 2-methyltetrahydrofuran; sulfoxides such as dimethyleulfoxide; oxolanes such as 1,3-dioxolane and 4-methyl-1,3-dioxolane; nitrogen-containing compounds such as acetonitrile and nitromethane; organic acid esters such as methyl formats, methyl acetate, ethyl acetate, butyl acetate, methyl propionate and ethyl propionate; inorganic acid esters such as phosphoric acid triesters, and carbonic acid diesters such as dimethyl carbonate, diethyl carbonate and dipropyl carbonate; diglymes; triglymes; sulfolanes; oxazolidinones such as 3-methyl-2-oxazolidinone; and sultones such as 1,3-propanesultone, 1,4-butanesultone and naphthasultone. These liquid mediums can be used either alone or as a mixture of at least two thereof.

The degree of polymerization of a polymer for the binder of the invention is determined by the following method. That is, weight average molecular weight is determined by a gel permeation chromatography (GPC) method. Average degree of polymerization is calculated by dividing the weight average molecular weight by the molecular weight of a monomer.

Particulars of the measuring methods, conditions and apparatuses employed in the working examples are as follows.

Measurement of polymerization degree of polymers for binders shown in Table 1: equipment: Type 655 (supplied by Hitachi Ltd.) with column W550 (30 cm×10.7 mmID), mobile phase: 0.1M sodium chloride solution injected at a flow rate of 1 ml/min, RI type detector used.

Measurement of polymerization degree of polymers for binders shown in Table 2: equipment: HLC type 802A (supplied by Tosoh Corp,) with column TSK gel GMHHR-H (60 cm×7.8 mmID), mobile phase: chloroform solution injected at a flow rate of 1 ml/min, RI type detector used.

For the determination of the degree of polymerization, a calibration curve is drawn for a polymer with a known molecular weight, and used for the calculation of polymerization degree of the target polymer.

The invention will now be described more specifically by the following working examples that by no means limit the scope of the invention.

In the working examples, characteristics of binders and batteries were evaluated by the following methods.

Retention % of Capacity at Repeated Charge-and-Discharge

A positive electrode was prepared by coating an aluminum foil collector having a thickness of about 20 μm with a slurry for positive electrode having the following composition,

| | |
|---|---|
| $LiCoO_2$ (specific surface area: 0.5 m$^2$/g) | 50 weight % |
| Carbon (specific surface area: 100 m$^2$/g) | 5 weight % |
| Binder | 5 weight % |
| Liquid medium | 40 weight % |
| Total: | 100 weight % |

The coated slurry was dried to obtain a positive electrode having a thickness of about 100 μm. A negative electrode was prepared by coating a copper foil collector having a thickness of about 10 μm with a slurry for negative electrode having the following composition.

| | |
|---|---|
| High purity graphite (specific surface area: 5 m$^2$/g) | 40 weight % |
| Binder | 5 weight % |
| Liquid medium | 55 weight % |
| Total: | 100 weight % |

The coated slurry was dried to obtain a negative electrode having a thickness of about 100 μm.

Using the thus-prepared positive electrode and negative electrode, a coin-shaped battery having a cross-sectional structure shown in FIG. 1 was fabricated.

The positive electrode and negative electrode were cut into a circular shape having a diameter of 15 mm. A battery was fabricated using the circular positive electrode 1, the negative electrode 2, and a separator 3, which was sandwiched between the positive electrode 1 and the negative electrode 2 so that the active material layers of the electrodes 1 and 2 confront to each other. The separator had a thickness of 1.35 mm and was comprised of a circular porous film having a diameter of 18 mm and a thickness of 25 μm and a polypropylene nonwoven fabric. The assembly of the electrodes and the separator was placed in a coin-shaped outer casing 4 having a diameter of 20 mm and a height of 1.8 mm and made of a stainless steel sheet having a thickness 0.25 mm. An aluminum foil 8 was placed on the bottom of a casing 4 so that the casing was kept in contact with the casing bottom and the positive electrode 1. A polypropylene packing 5 was packed within the casing 4. An electrolyte, which was a solution of $LiPF_6$ with a concentration of 1 mol/liter of a mixed solvent composed of ethylene carbonate and diethyl carbonate at a mixing ratio of 1:1 by volume, was injected into the casing 4 so that no air remained within the casing 4. The thus-fabricated assembly was covered with a stainless steel cap 6 having a thickness of 0.2 mm via the polypropylene packing 5 so that a copper foil 7 was placed in contact with the inner surface of the cap 6 and the negative electrode 2. The assembly was sealed whereby a coin-shaped battery having a diameter of 20 mm and a thickness of about 2 mm was obtained.

Each of the 20 batteries was charged to 4.0 V by a static current method at a current density of 0.1 $mA/cm^2$, and then discharged to 3.0 V. The charge and discharge were repeated and the capacity was measured. An average capacity was calculated from the values obtained by measurement on the 20 batteries. The retention of capacity at repeated charge-and-discharge was expressed by percentage of the ratio (A/B) of the capacity (A) as measured at the completion of 50 cycles to the capacity (B) as measured at the completion of 5 cycles. The smaller the retention of capacity, the poorer the binding durability of battery.

Binding Power

The binding power of a binder was evaluated in terms of adhesion between the collector and the coated active material as measured by a lattice pattern cutting test according to JIS K-5400 on each of the above-fabricated batteries. The test results were expressed by assigning ten ratings from 1 to 10. The higher the rating, the better the binding power.

EXAMPLES 1–4

Comparative Examples 1, 2

The slurry for a positive electrode and the slurry for a negative electrode were prepared by using vinyl alcohol-vinyl acetate copolymers for binder having compositions (% by weight) shown in Table 1, below. Water was used as the liquid medium for the slurry for a positive electrode and the slurry for a negative electrode in Examples 1 to 4 and Comparative Examples 1 and 2. The results of tests for the retention % of capacity at repeated charge-discharge cycles and the binding power are shown in Table 1.

TABLE 1

| | Polymer for binder | | | Capacity retention | Binding power | |
|---|---|---|---|---|---|---|
| | Composition | | | | | |
| | Units of formula (1) (wt %) | Vinyl acetate units (wt %) | Polymerization degree | % after repeated charge-discharge | positive electrode | negative electrode |
| Ex 1 | 92 | 8 | 1000 | 97 | 7 | 7 |
| Ex 2 | 86 | 14 | 900 | 97 | 8 | 7 |
| Ex 3 | 57 | 43 | 1500 | 96 | 8 | 8 |
| Ex 4 | 31 | 69 | 800 | 90 | 9 | 8 |
| C. Ex 1 | 21 | 79 | 1000 | 50 | 9 | 9 |
| C. Ex 2 | 97 | 3 | 1000 | 97 | 4 | 3 |

Note,
Ex: example of the invention, C. Ex: comparative example

As seen from Table 1, vinyl alcohol-vinyl acetate copolymers exhibit good charge-discharge cycling characteristics and good binding power, when the copolymers contain at least 304 by weight of vinyl alcohol units.

EXAMPLES 5–8

Comparative Examples 3, 4

The procedures of Examples 1–4 were repeated wherein ethylene-vinyl acetate copolymers having compositions shown in Table 2 were used as the vinyl alcohol polymer. All other conditions remained the same. The retention of capacity after repeated charge-and-discharge and the binding power were tested. The results dare shown in Table 2.

TABLE 2

| | Polymer for binder | | | Capacity retention | Binding power | |
|---|---|---|---|---|---|---|
| | Composition | | | | | |
| | Units of formula (1) (wt %) | Ethylene units (wt %) | Polymerization degree | % after repeated charge-discharge | positive electrode | negative electrode |
| Ex 5 | 80 | 20 | 12000 | 95 | 8 | 8 |
| Ex 6 | 71 | 29 | 15000 | 95 | 8 | 8 |
| Ex 7 | 66 | 34 | 13000 | 97 | 8 | 8 |
| Ex 8 | 63 | 37 | 10000 | 96 | 9 | 8 |
| C. Ex 3 | 25 | 75 | 12000 | 55 | 10 | 9 |
| C. Ex 4 | 98 | 2 | 15000 | 96 | 5 | 4 |

Note,
Ex: example of the invention, C. Ex: comparative example

As seen from Table 2, vinyl alcohol-ethylene copolymers also exhibit good charge-discharge cycling characteristics and good binding power, when the copolymers contain at least 30% by weight of ethylene units.

EXAMPLES 9–15

The procedures of Examples 1–4 were repeated wherein an ethylene-vinyl alcohol copolymer having a composition shown in Table 3 was used as the vinyl alcohol polymer in Example 9, and the same ethylene-vinyl alcohol copolymer was used in combination with other polymer binder as the binder and methyl ethyl ketone was used instead of water as the liquid medium in Examples 10 to 13. All other conditions remained the same. The ethylene-vinyl alcohol copolymer used had a weight average molecular weight of 15,000. The retention of capacity after repeated charge-discharge cycles and the binding power were tested. The results are shown in Table 4.

TABLE 3

| | PVA polymer binder | | Polymer binder used in combination with | |
|---|---|---|---|---|
| | Composition [Ratio of ethylene/vinyl alcohol in copolymer] (ratio by weight) | Amount (wt %) | PVA polymer binder Copolymer Composition (ratio by weight) | Amount (wt %) |
| Ex 9 | 34/66 | 100 | — | — |
| Ex 10 | 34/66 | 70 | Styrene/1,3-butadiene copolymer[24/76] | 30 |
| Ex 11 | 34/66 | 75 | Polymethyl methacrylate | 25 |
| Ex 12 | 34/66 | 80 | Hydroxyethyl cellulose | 20 |
| Ex 13 | 34/66 | 80 | Polyvinylidene fluoride | 20 |
| Ex 14 | 34/66 | 50 | Styrene/1,3-butadiene copolymer[24/76] | 50 |
| Ex 15 | 34/66 | 20 | Styrene/1,3-butadiene copolymer[24/76] | 80 |

TABLE 4

| | Capacity retention after repeated charge-discharge (%) | Binding power Positive electrode | Binding power Negative electrode |
|---|---|---|---|
| Ex 9  | 95 | 8 | 8 |
| Ex 10 | 92 | 8 | 8 |
| Ex 11 | 90 | 9 | 8 |
| Ex 12 | 89 | 8 | 7 |
| Ex 13 | 88 | 8 | 8 |
| Ex 14 | 87 | 8 | 8 |
| Ex 15 | 86 | 8 | 8 |

EXAMPLE 16

The procedure of Example 9 was repeated wherein a vinyl alcohol-vinyl butyral-vinyl acetate copolymer (copolymerization ratio=50:35:15 by weight, average degree of polymerization=15000) was used alone as the polymer binder with all other conditions remaining the same. The retention of capacity at repeated charge-discharge cycles was 92%, and the binder power was 8 for the positive electrode and 8 for the negative electrode.

As seen from Tables 1–4, when any of water or an organic solvent is used as the liquid medium for the preparation of the slurry of the invention, good results can be obtained. Even when the vinyl alcohol copolymer is used in combination with other polymeric binders as the binder, good capacity retention at repeated charge-discharge cycles and good binding power can be obtained (Examples 9–15).

Industrial Applicability

By using a vinyl alcohol polymer containing 30 to 95% by weight of vinyl alcohol units as a binder for the preparation of an electrode, a high adhesion of an active material to a collector is obtained and the resulting electrode exhibits an enhanced retention of the active material. Thus, in a non-aqueous electrolyte secondary battery fabricated by using an electrode prepared by using the binder of the invention, an active material exhibits an enhanced binding power for a collector, and therefore, separation of the active material from the collector does not occur or is minimized when charge and discharge are repeated many times. That is, the charge-discharge cycling characteristics are satisfactory.

What is claimed is:

1. A binder for an electrode of a non-aqueous electrolyte secondary battery comprising a vinyl alcohol polymer having 30 to 95% by weight of recurring units expressed by the following formula (1):

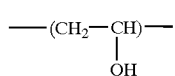   (1)

and 5 to 70% by weight of at least one kind of recurring units selected from the group consisting of the following formulae (2), (3) and (6) to (9):

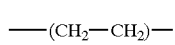   (2)

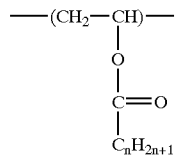   (3)

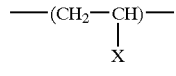   (6)

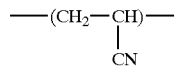   (7)

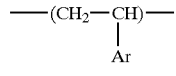   (8)

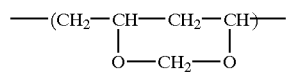   (9)

wherein n is an integer independently selected from the range of 1 to 8, Ar is an aromatic group, and X is a halogen.

2. The binder for an electrode of a non-aqueous electrolyte secondary battery according to claim 1, further comprising a polymer binder in an amount of not more than 800 parts by weight, based on 100 parts by weight of the vinyl alcohol polymer.

3. A slurry for an electrode of a non-aqueous electrolyte secondary battery containing the binder as claimed in claim 1, an active material and a liquid medium.

4. The slurry for an electrode of a non-aqueous electrolyte secondary battery according to claim 3, wherein the active material is at least one selected from the group consisting of an active material for a negative electrode, which is a carbonaceous material, and an active material for a positive electrode, which is selected from the group consisting of transition metal oxides, transition metal chalcogenides, lithium compounds of transition metal oxide and lithium compounds of transition metal chalcogenides.

5. An electrode for a non-aqueous electrolyte secondary battery, which is fabricated by coating a collector with the slurry as claimed in claim 3, and then drying the thus-formed coating.

6. A non-aqueous electrolyte secondary battery having the electrode as claimed in claim 5 as at least one of a positive electrode and a negative electrode.

7. The binder for an electrode of a non-aqueous electrolyte secondary battery according to claim 1, wherein the vinyl alcohol polymer has 30 to 95% by weight of the recurring units of formula (1) and 5 to 70% by weight of at least one kind of recurring unit selected from the group consisting of units represented by formula (2), and formula (3) wherein n is 1.

8. The binder for an electrode of a non-aqueous electrolyte secondary battery according to claim 2, wherein the polymer binder used in addition to the vinyl alcohol polymer is at least one polymer selected from the group consisting of homopolymers and copolymers of a conjugated diene, homopolymers and copolymers of acrylic acid esters, and homopolymers and copolymers of methacrylic acid esters.

9. The binder for an electrode of a non-aqueous electrolyte secondary battery according to claim 7, further comprising a polymer binder in an amount of not more than 800 parts by weight, based on 100 parts by weight of the vinyl alcohol polymer.

10. The binder for an electrode of a non-aqueous electrolyte secondary battery according to claim 9, wherein the polymer binder used in addition to the vinyl alcohol polymer is at least one polymer selected from the group consisting of homopolymers and copolymers of a conjugated diene, homopolymers and copolymers of acrylic acid esters, and homopolymers and copolymers of methacrylic acid esters.

11. The slurry for an electrode of a non-aqueous electrolyte secondary battery according to claim 3, wherein the binder comprises a vinyl alcohol polymer containing 30 to 95% by weight of the recurring units of formula (1) and 5 to 70% by weight of at least one kind of recurring unit selected from the group consisting of units represented by formula (2), and formula (3) wherein n is 1.

12. The slurry for an electrode of a non-aqueous electrolyte secondary battery according to claim 11, wherein the active material is at least one selected from the group consisting of an active material for a negative electrode, which is a carbonaceous material, and an active material for a positive electrode, which is selected from the group consisting of transition metal oxides, transition metal chalcogenides, lithium compounds of transition metal oxide and lithium compounds of transition metal chalcogenides.

13. The electrode for a non-aqueous electrolyte secondary battery according to claims 5, wherein the binder comprises a vinyl alcohol polymer containing 30 to 95% by weight of the recurring units of formula (1) and 5 to 70% by weight of at least one kind of recurring unit selected from the group consisting of units represented by formula (2), and formula (3) wherein n is 1.

14. A non-aqueous electrolyte secondary battery having the electrode as claimed in claim 13, as at least one of a positive electrode and a negative electrode.

* * * * *